United States Patent
Brunk et al.

(10) Patent No.: US 6,546,116 B2
(45) Date of Patent: *Apr. 8, 2003

(54) ADJUSTING AN ELECTRONIC CAMERA TO ACQUIRE AN IMAGE

(75) Inventors: Hugh Brunk, Portland, OR (US); Eliot Rogers, Beaverton, OR (US); Brett T. Hannigan, Portland, OR (US)

(73) Assignee: Digimarc Corporation, Tualatin, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 10/002,352

(22) Filed: Nov. 13, 2001

(65) Prior Publication Data

US 2002/0064297 A1 May 30, 2002

Related U.S. Application Data

(63) Continuation of application No. 09/444,770, filed on Nov. 22, 1999, now Pat. No. 6,366,680.

(51) Int. Cl.$^7$ .......................... G06K 9/00; H04N 17/00; H04N 7/167
(52) U.S. Cl. ...................... 382/100; 382/312; 382/168; 382/274; 348/187; 380/200
(58) Field of Search ................................ 382/100, 162, 382/168, 181, 254, 274, 275, 312; 348/187, 175, 176, 207.1, 207.11; 380/200

(56) References Cited

U.S. PATENT DOCUMENTS

| | | | |
|---|---|---|---|
| 5,194,960 A | | 3/1993 | Ota |
| 5,572,433 A | * | 11/1996 | Falconer et al. ............... 226/2 |
| 5,862,218 A | * | 1/1999 | Steinberg .................... 348/231 |
| 5,901,224 A | * | 5/1999 | Hecht .......................... 283/113 |
| 6,177,956 B1 | | 1/2001 | Anderson |
| 6,366,680 B1 | * | 4/2002 | Brunk et al. ................. 348/229 |

* cited by examiner

Primary Examiner—Bhavesh M. Mehta
Assistant Examiner—Kanji Patel
(74) Attorney, Agent, or Firm—Elmer Galbi

(57) ABSTRACT

The present invention provides a mechanism for automatically setting the exposure time and gain of an electronic camera so that the acquired image has improved characteristics for the detection of a digital watermark. With the present invention the exposure time and gain of an electronic camera are set by first directing the camera at a test target with the camera's controls set to a default set of values. The system then calculates a histogram of the luminance values of the pixels in the image. Next characteristic values from the histogram such as the peak value, the centroid value, the RMS value, the median value, etc. are calculated. One or more of the characteristic values of the histogram are then applied as an index or pointer to values of pre-established settings that are stored in a table. Values from the table are used to set the exposure time and/or gain of the camera. In some embodiments, the variance of the luminance histogram is also measured and used to index data from the table.

22 Claims, 4 Drawing Sheets

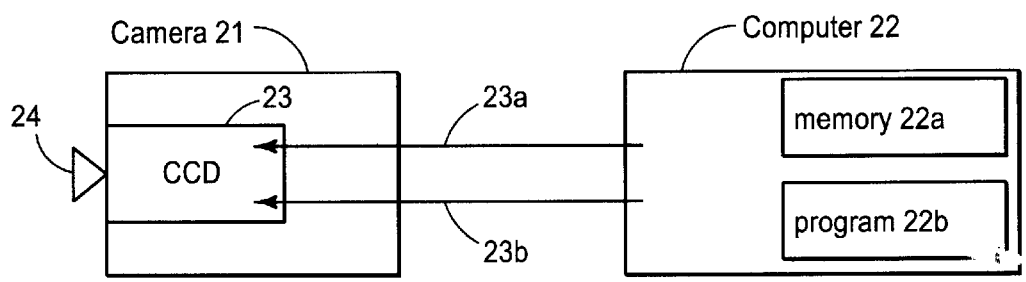
FIG. 2
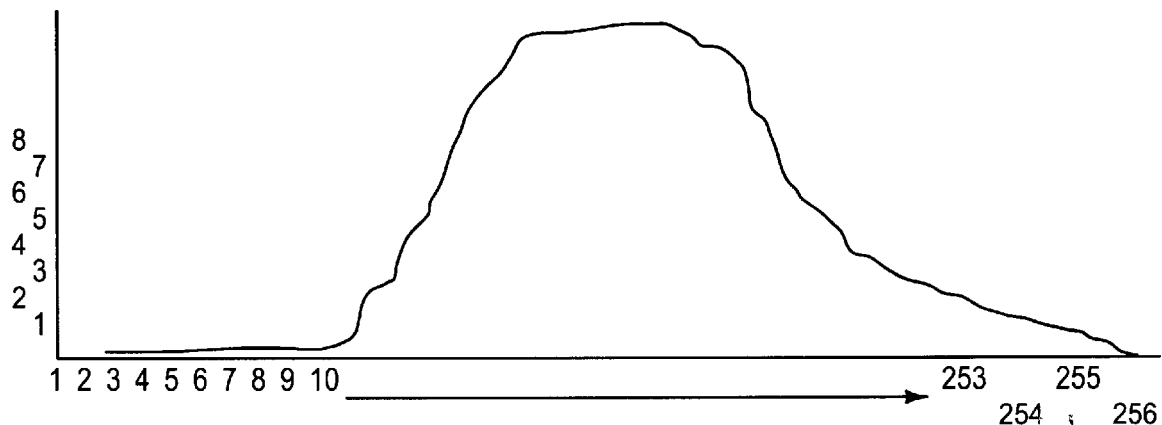
FIG. 3
FIG. 4
| Centroid Value | Exposure Time |
|---|---|
|  |  |
|  |  |
|  |  |
|  |  |
|  |  |
|  |  |
|  |  |
|  |  |

ADJUSTING AN ELECTRONIC CAMERA TO ACQUIRE AN IMAGE

RELATED APPLICATION

This application is a continuation of application Ser. No. 09/444,770 filed Nov. 22, 1999 and now U.S. Pat. No. 6,366,680.

FIELD OF THE INVENTION

This invention relates to electronic cameras and more particularly to the control of electronic cameras.

BACKGROUND OF THE INVENTION

Electronic cameras are commercially available and in widespread use. The basic technology used in electronic cameras is well developed. Electronic cameras generally include CCD or CMOS light sensing elements. The exposure time of the light sensing elements and the gain of the readout circuitry can be set to control the quality of the images which are acquired by the camera.

Some electronic cameras have a built in exposure meter that detects the amount of light reaching the camera. The appropriate exposure time and gain of the sensing elements is then automatically set at values determined by the signal generated by the exposure meter.

Some electronic video cameras which are designed for integration into a personal computers provide the user with a menu such as that shown in FIG. 1 which can be used to set various parameters to control the operation of the camera. A user typically sets the various parameters so that the camera will produce an image that is visually appealing to a human observer. A program in the computer adjusts the actual settings in the camera in a direction which attempts to have the images meet the specifications set by the user. This type of adjustment may take place over several sequential frames. Furthermore as ambient conditions change, the actual exposure time and gain of the sensing elements is varied between frames in an effort to meet the specifications set by the user.

Electronic cameras can be used as part of systems such as that shown in copending application Ser. Nos. 09/314,648, 09/343,104, 60/158,015, and [attorney docket 60037, filed Nov. 3, 1999]. The systems shown in the referenced copending applications are designed to detect a digital watermark in an image acquired by a video camera. In such systems after a video camera is used to acquire an image, the acquired image is digitally processed to detect a digital watermark that is contained in the image. It has been found that the optimal settings for a camera used in such systems is not necessarily the optimal settings that are established to provide a pleasing image to a human viewer.

The type of parameters that can be established using a menu such as that shown in FIG. 1 do not always produce optimal conditions for detecting a digital watermark in an acquired image.

SUMMARY OF THE PRESENT INVENTION

The present invention provides a mechanism for automatically setting the exposure time and gain of an electronic camera so that the acquired image has improved characteristics for the detection of a digital watermark. With the present invention the exposure time and gain of an electronic camera are set by first directing the camera at an image with the camera's controls set to a set of default or initial values. The system then calculates and stores data which represents a histogram of the luminance values of the pixels in the acquired image. Next characteristic values from the histogram data such as the peak value, the centroid value, the RMS value, the median value, etc., are calculated. One or more of the characteristic values of the histogram data are then applied as an index or pointer to values of pre-established settings that are stored in a table. Values from the table are used to set the exposure time and/or gain of the camera. In some embodiments, the variance of the luminance histogram data is also measured and used to index data from the table. In some embodiments, a test target is used to acquire an initial image. In other embodiments, the initial image is made by pointing the camera at the image which contins the watermark data.

DETAILED DESCRIPTION OF THE FIGURES

FIG. 2 is an overall diagram of a first embodiment of the present invention.

FIG. 3 is a diagram that illustrates a luminance histogram.

FIG. 4 is a diagram illustrating a table which stores values for exposure time for a camera's shutter.

DETAILED DESCRIPTION OF EMBODIMENTS OF THE INVENTION

Figure 1:
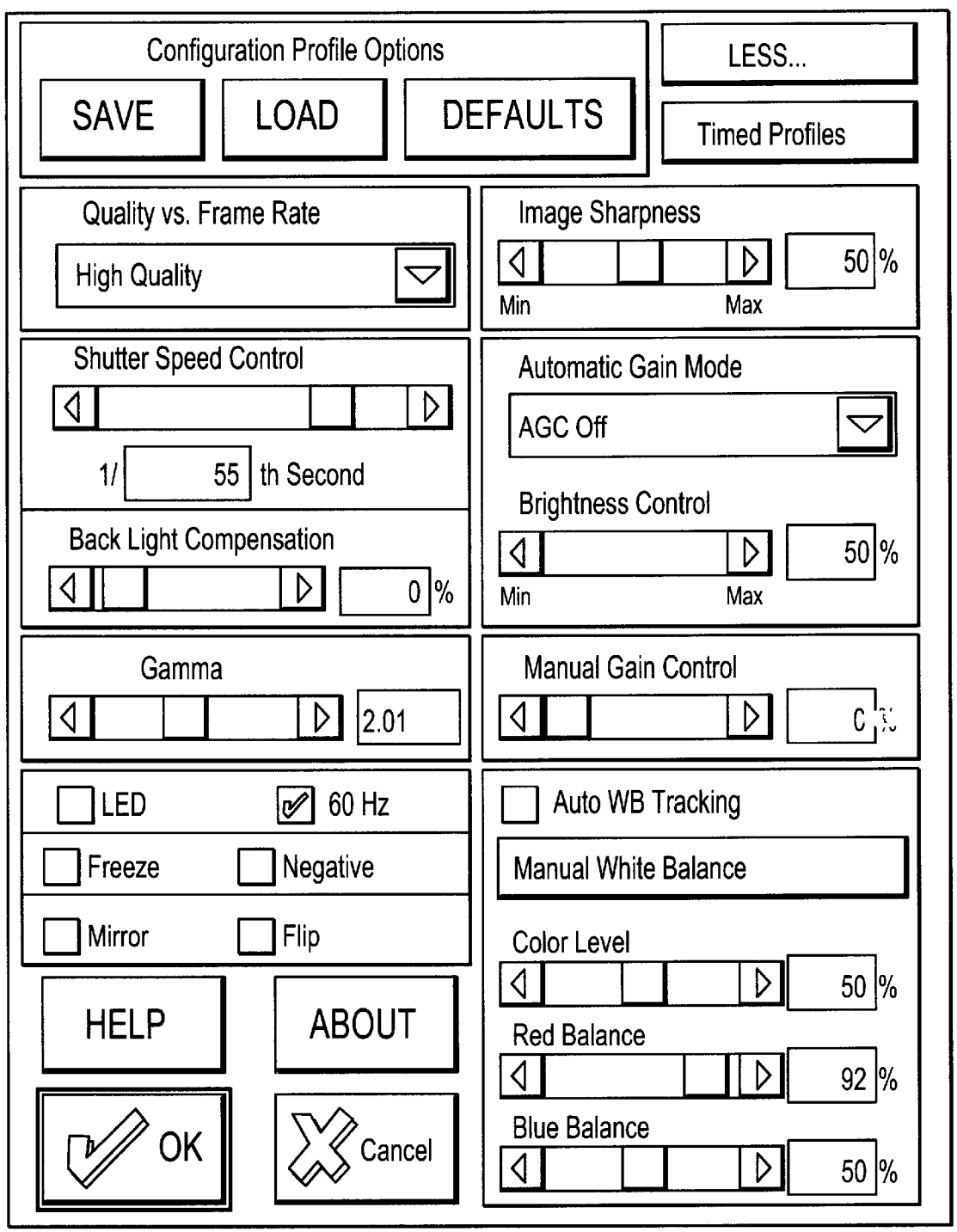
FIG. 1 illustrates the screen presented to a user to enable the user to set the values that control a camera.

The overall system shown in FIG. 2 includes a conventional digital camera 21 and a conventional control computer 22. As is conventional the camera 21 includes a CCD detector 23 and a lens 24 which focuses an image on the CCD detector. The CCD detector 23 has a gain control line 23a and an exposure control line 23b. The control computer 22 controls the values on the lines 23a and 23b. While for convenience of illustration and explanation the camera 21 is shown in FIG. 2 as an individual unit separated from control computer 22, it should be understood that in many commercially available systems the camera 21 is mounted within (or attached to) the computer 22 and lines 23a and 23b represent logical control lines rather than physical wires.

As is conventional the computer 22 includes memory 22a and programming 22b. For convenience and clarity of illustration and explanation these are illustrated as separate boxes in FIG. 2. The other conventional parts of the camera 21 and the computer 22 are not illustrated in FIG. 2 and not discussed herein since they are not particularly relevant to an explanation of the invention.

In the first preferred embodiment of the present invention, the camera 21 is first directed at a test target with the exposure time and gain of the camera set to the default values. When the camera is activated, the camera will detect an image, each pixel of which has a certain luminance value. The luminance value of each pixel is a particular numeric value between 0 and 255. The number of pixels at each luminance value is counted. The count values form a histogram such as that shown in FIG. 3. Naturally in computer 22, the histogram is stored as data values. FIG. 3 is merely an illustration of an example of such data.

The test target used in the first preferred embodiment is a standard photographer's "gray card". That is, a card that has an image consisting of a gray background that is eighteen percent gray.

Various mathematical parameters can be calculated from a histogram (or from the data that can form a histogram). In first the preferred embodiment, the centroid value of the luminance data is calculated and used for subsequent operations. However, it is noted that in alternative embodiments, other values are used including:

a) The peak value of the histogram,
b) The root-mean-square value of the points that form the histogram,
c) The median value of the points that form the histogram.
d) The deviation value of the curve.
e) etc.

The value of a parameter from the histogram data (in the first preferred embodiment that is the centroid value) is used as an index or pointer to values in a table which contains exposure values. An example of such a table is given in FIG. 3. Naturally it should be understood that in computer 22, the data is stored as a conventional data table. FIG. 4 is merely an illustration of such a table.

Figure 5:
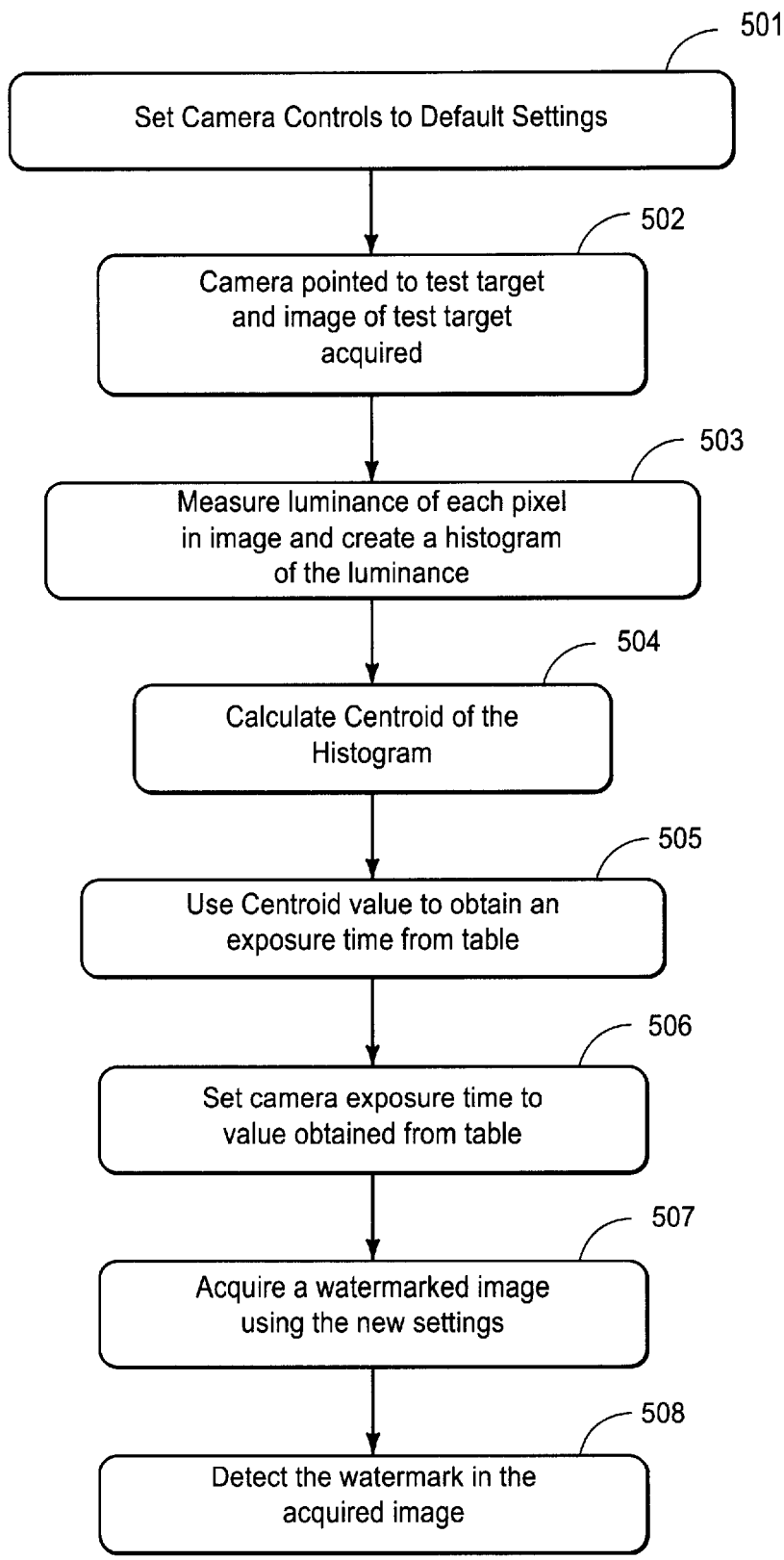
FIG. 5 is a flow diagram of the control program executed by the computer embedded in the camera.

FIG. 5 is a flow diagram illustrating the steps in the operation of the system shown in FIG. 2. First, as indicated by block 501, the control parameters of the camera are set to a set of default values. In particular the exposure time is set to 1/60 second. Next as indicated by block 502, the camera is pointed at a test target and an image is acquired. The test target is a conventional photographers gray scale that is eighteen percent gray.

The luminance of the pixels in the image are measured (as indicated by block 503) and a histogram of the luminance values is generated. In the particular embodiment, each pixel has a luminance between 0 and 255 (i.e. an 8 bit representation) and the histogram has an appearance somewhat like the histogram shown in FIG. 3. Naturally, the actual values will be dependent on various factors such as the amount of ambient light present. Furthermore, if a 16 bit system were used, the luminance would have values between 0 and 65535.

Next (as indicated by block 504) the centroid of the histogram is calculated in a conventional manner. That is, the centroid is calculated from the luminance data directly. There is no need to actually construct or calculate the histogram. The histogram is merely discussed herein to principles of the invention. A centroid is calculated directly from the luminance data by adding together each luminance value times the number of pixels at that value. For example: assume that there are:

3 pixels with value 1,
2 pixels with value 2
6 pixels with value 3
5 pixels with value 4
etc The centroid is then calculated as:

$$(3 \times 1 + 2 \times 2 + 6 \times 3 + 5 \times 4 + \ldots \text{etc.})/(3 + 2 + 6 + 5 \ldots \text{etc.})$$

The value calculated for the centroid is used as an index or pointer to select a value in a table such as the table shown in FIG. 4 as indicated by block 506).

Next (block 506) the exposure time for the camera is set to the value obtained from the table and an image is acquired using that exposure time (block 507). Finally (block 508) a watermark is read from the acquired image in a conventional manner.

Figure 6:
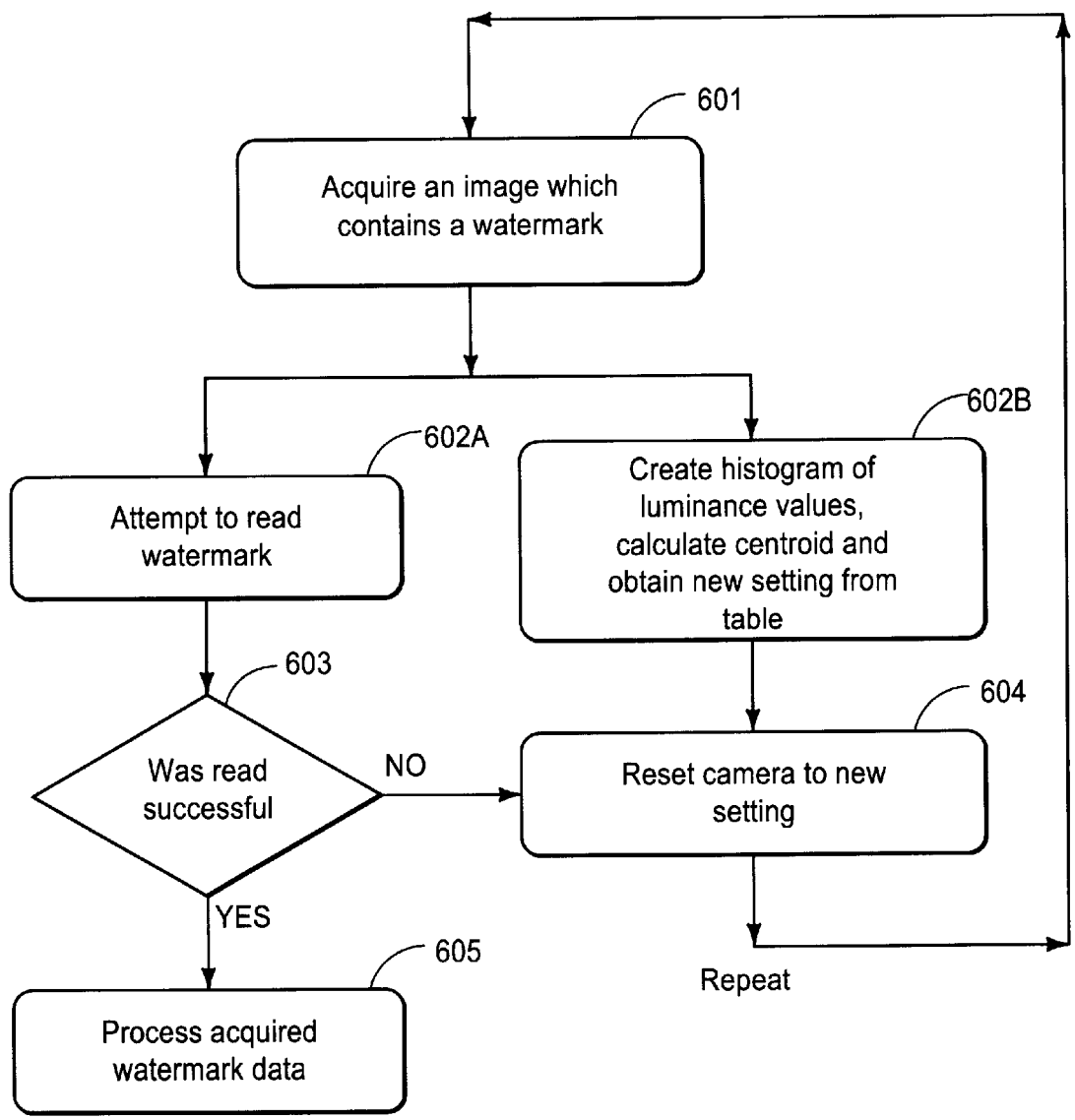
FIG. 6 is a flow diagram of an alternative embodiment.

A flow diagram for a second preferred embodiment of the invention is shown in FIG. 6. In this alternative embodiment, no test target is used. Instead, the camera is pointed at the image which contains a watermark and repeated frames containing the image are acquired.

Between each frame a new setting for the camera is calculated using luminance values as previously described; however, in this embodiment, the luminance values are the luminance values of an image that contains a watermark. After each image is acquired an attempt is made to read the watermark, if the watermark can not be read, the new camera setting are used to acquire another image. The process repeats until the watermark can be read.

FIG. 6 is a flow diagram of the operations. The camera is set to a relatively slow frame rate (such as five frames per second) so that there is sufficient time between frames to process the data to detect a watermark. This operation is conventional. The calculations to determine a new setting for the camera take much less time than do the calculations to detect a watermark.

The process begins as indicated by block 601 when the camera is pointed at an image containing a watermark and an image is acquired. As indicated by blocks 602A and 602B, two operations proceed in parallel. First an attempt is made to read the watermark. If that is successful (block 603) the operation goes to block 605 where the watermark data is used for purposes such as those described in the previously referenced co-pending applications. The second program that operates after each image is acquired in the program indicated by block 602B. This program assembles data that forms a histogram of the luminance of the pixels in the image, the centroid is calculated and a new exposure value is obtained from a table (similar to the operation of the previous embodiment). Next the camera is set to the new exposure value as indicated by block 604.

Finally if the watermark reading operation was not successful another image is acquired and the process repeats.

The following is a more a specific description of a program that implements the operations shown in FIG. 6. This embodiment of the invention utilizes a commercially available "3Com HomeConnect" PC Digital Camera. The camera as commercially available provides a software interface, which allows many parameters to be queried and modified. The available parameters and their value ranges shown in parenthesis are:

Enable/disable the interface (e/d)
Enable/disable Auto White Balance (AWB) tracking (e/d)
Red balance (0–255)
Blue balance (0–255)
Color saturation (0–255)
Set the mode of Auto Gain Control (AGC) operation (disabled, average mode, average center window mode, peak mode)
AGC bias (0–100)
Shutter value (0–3900)
Video gain (0–255)
Gamma value (0–255)
Image sharpness (0–255)

The only parameter that the program which implements the present invention changes dynamically in its automatic operation is the shutter value. This value relates to a shutter speed and has a non-linear range of 0–3900. In this scale, 0 is a shutter speed (or exposure) of 1/31,500 of a second and 3900 is a shutter speed of 1/4 of a second.

When the program starts, the first thing it does is to enable the software interface to the camera. The program saves the current values of all the camera parameters and then puts in its own set of values. The camera's initial values will be restored when the program shuts down. The following are initial values for various parameters that have been found to operate satisfactorily in this particular embodiment of the invention.

| AWB: | disabled |
|---|---|
| Red balance: | 225 |
| Blue balance: | 128 |
| Color saturation: | 128 |
| AGC: | disabled |
| Video gain: | 128 |
| Shutter: | 174 |
| Gamma: | 100 |

When each image is acquired the program starts examining the video frame for watermarks as indicated by block 602A. As each frame is received, its luminance centroid is calculated and compared to our target luminance. The program dynamically adjusts the shutter value in order to move the centroid towards the target luminance as indicated by block 604.

Values used in the algorithm:

Target luminance: 110 (range is 0–255)

Distance is the distance between Centroid and Target

Midpoint is one half of Distance

Direction flag: set to 1 if Centroid <Target, otherwise set to −1

LastShutter is the shutter value from the last frame we received

Shutter is the current shutter value

LastLuminance is the centroid for the last frame we received

DeltaLuminance is the difference between LastLuminance and Centroid

AdjustmentAmount is the change that we will be making to the Shutter value for this frame LastAdjustment is the AdjustmentAmount we made on the last frame we received Adjustment table (defined below)

The adjustment table lays out ranges of luminance values along with adjustment factors and a scale flag. The adjustment factor is a multiplier which is used along with the distance from Centroid to Midpoint. If the scale flag is set for a particular range then the Current Shutter value is also factored into calculations involving that range.

| Lower bound | Upper bound | Factor | Flag |
|---|---|---|---|
| 0 | 29 | 7.5 | Off |
| 30 | 69 | 0.75 | On |
| 70 | 94 | 0.95 | On |
| 95 | 104 | 0.75 | On |
| 105 | 115 | 0.5 | On |
| 116 | 135 | 0.5 | On |
| 136 | 150 | 0.7 | On |
| 151 | 225 | 1.5 | On |
| 226 | 255 | 2.0 | Off |

The following algorithm is implemented by the program:

If Centroid has not changed since the last frame and the distance from Centroid to Target <20 then don't make any adjustments Set CurrentAdjustment to 0

Walk through the Adjustment Table. For each entry in the table, if any part of the Area, defined as the area between Centroid and Midpoint falls within the range of Lower Bound to Upper Bound then calculate Scale and AdjustmentIncrement as follows:
  If Flag is Off then
    Scale=Factor
  Else
    Scale =Factor*Log (Current Shutter)
  AdjustmentIncrement=(amount of Area that falls between Lower Bound and Upper Bound )*Scale*Direction
  Each AdjustmentIncrement is added to CurrentAdjustment.

Compare DeltaLuminance to LastAdjustment. If DeltaLuminace is a positive number while LastAdjustment is negative or vice-versa then it means that movement of Centroid is going in the opposite direction from our adjustments. We will continue to adjust until Centroid movement switches directions, then we will slow down and wait for Centroid to catch up. At the same time we will limit CurrentAdjustment changes to be no more than 25% of the Shutter value.

```
        AdjustmentPercentage = Abs( CurrentAdjustment / Shutter )
        If AdjustmentPercentage > 25%
            CurrentAdjustment = Shutter * 25% * Direction
Else
        CentroidRate = Abs( DeltaLuminance / LastLuminance )
        If LastAdjustment was non-zero and CurrentAdjustment is non-zero
            ShutterRate = Abs( LastAdjustment / LastShutter )
            AdjustmentRatio = Abs( CurrentAdjustment / LastAdjustment )
            If ShutterRate > CentroidRate and ShutterRate < AdjustmentRatio
                AdjustmentPercentage = Abs( CurrentAdjustment / Shutter )
                MaxPercentage = ( Target − Distance ) / Target
                If AdjustmentPercentage > MaxPercentage
                    CurrentAdjustment = Shutter * MaxPercentage *
Direction
                Else
                    TestAdjustment = CurrentAdjustment * 3 *
CentroidRate / ShutterRate
                    If TestAdjustment < CurrentAdjustment
                        CurrentAdjustent = TestAdjustment
        Check to make sure that CurrentAdjustment will not push Shutter below 0. If so
then
            CurrentAdjustment = Shutter * 2/3 * Direction
```

-continued

```
Make the change then update our values:
Shutter = Shutter + CurrentAdjustment
LastShutter = Shutter
LastCentroid = Centroid
LastAdjustment = CurrentAdjustment
```

It is noted that in the preferred embodiments described above, the invention is used to only set the exposure time of the camera. In other embodiments, the table shown in FIG. 4 is expanded to also include the value of the gain and the gain of the camera is set utilizing the present invention. In such an embodiment both exposure time and gain can be set using one parameter from the histogram data. Various rules could be used to construct the table used to obtain values of the exposure time and gain, that is, to map the one dimensional parameter value into a two dimensional exposure/gain value. In similar fashion other parameters of the camera can be set utilizing the present invention.

While the invention has been described with respect to preferred embodiments thereof, it should be understood that various other changes in form and detail are possible without departing from the sprit and scope of the invention. For example, while the invention is particularly illustrated with reference to a camera employing a CCD detector, any other optical sensor technology can likewise be employed. Similarly, while the invention is particularly described with reference to a video camera, the same principles are equally applicable to watermark detection with non-video image acquisition device. Yet further, while a table was used in the illustrated embodiment to generate camera settings, other known structures and approaches (e.g., formulas) using the same or similar input information can be readily substituted. Still further, while a histogram was described as a preferred analysis technique, other statistical analyses for characterizing the camera's response can similarly be utilized. Accordingly, the scope of applicant's invention is limited only by the structure and methods described in the appended claims and equivalents thereto.

We claim:

1. The method of re-adjusting a control setting of an electronic camera from p default value which comprises:
   acquiring a first image with said camera with said control setting set at said default value,
   said first image having pixels which have luminance values,
   the luminance values of the pixels in said first image forming a histogram,
   calculating the value of at least one parameter of said histogram,
   using said value of said parameter to determine a second value for said control setting,
   adjusting said control setting to said second value,
   acquiring at least one additional image with said control selling set to said second value.

2. The method in claim 1 wherein the first image acquired by said camera is an image of a photographer's gray card.

3. The method claimed in claim 1 wherein said parameter is the centroid of said histogram.

4. The method claimed in claim 1 wherein said first image has stored therein a digital watermark.

5. The method claimed in claim 1 wherein said additional image has stored therein a digital watermark.

6. The method in claim 1 wherein said parameter is the peak value of said centroid.

7. The method in claim 1 wherein said control setting is the exposure time of said camera.

8. The method in claim 1 wherein said parameter is the variance of said histogram.

9. The method in claim 1 wherein control setting includes the gain of said camera.

10. An image acquisition system which has at least one control which can adjusted, said control initially being set to a default value while a first image is acquired,
    said first image having pixels which have luminance values,
    the luminance values of the pixels in said first image forming a histogram,
    a computer for calculating the value of at least one parameter of said histogram and for using said value to obtain a second value for said control setting,
    whereby subsequent images acquired by said image acquisition system are acquired with said control setting set to said second value.

11. A method of operating an electronic camera which has at least one control setting which can be adjusted and a programmed computer which controls the value of said setting, said method including the steps of:
    first adjusting said control setting to a default value,
    acquiring a first image with the camera with said control setting adjusted to said default value, said first image having pixels that have luminance values, the luminance values of the pixels in said first image forming a histogram,
    calculating the value of at least one parameter of said histogram and using said value to obtain a second control setting value for said control setting,
    adjusting said control setting in accordance with said second value,
    acquiring at least one additional image with said control setting set to said second control setting value.

12. The method recited in claim 1 wherein said first image is an image of a photographer's gray card.

13. The camera recited in claim 11 wherein said control setting is the centroid of said histogram.

14. The camera recited in claim 11 wherein said control setting is the peak value in said histogram.

15. The camera recited in claim 11 wherein said control setting is the exposure time of said camera.

16. The method recited in claim 1 wherein said first image and said additional image contain a digital watermark.

17. A method for adjusting the control setting of a camera which includes the. steps of:
    step 1: setting said control setting to a default value,
    step 2: acquiring with said camera a digital image of a watermarked physical image,
    said digital image having pixels that have luminance values, the luminance values of said pixels forming a histogram,
    step 3: calculating the value of at least one parameter of said histogram formed by the luminance values of the pixels in said last acquired digital image, step 4: using said value of said parameter to obtain a new value for said control setting, step 5: adjusting said camera in accordance with said new value of said control setting, step 6: acquiring an additional digital image of said watermarked physical image, step 7: attempting to react a watermark in said additional digital image, and step 8: if said read operation is not successful, repeating said process beginning with step 3.

18. The method recited in claim 17 wherein said parameter is the centroid of said histogram.

19. The method recited in claim 17 wherein said control setting is the exposure time of said camera.

20. The method of re-adjusting a control setting of an electronic camera from a first value which comprises:

acquiring a first image with said camera with said control setting set at said first value, said first image having pixels which have values of particular characteristics, the values of a particular characteristic of the pixels in said first image forming a statistical pattern, calculating the value of at least one parameter of said statistical pattern, using said value of said parameter to determine a second value for said control setting, adjusting said control setting to said second value, acquiring at least one additional image with said control setting set to said second value.

21. The method claimed in claim 20 wherein said images contain a digital watermark.

22. The method in claim 20 wherein the setting of said second value is such that it facilitates reading coded information stored in said additional image.

* * * * *